United States Patent
Danelski

(10) Patent No.: US 9,944,470 B2
(45) Date of Patent: Apr. 17, 2018

(54) CONVEYING SYSTEMS AND METHODS OF ASSOCIATING DATA WITH AN ITEM TRANSPORTED BY A CONVEYING SYSTEM

(71) Applicant: MATTHEWS RESOURCES, INC., Wilmington, DE (US)

(72) Inventor: Darin Danelski, Oconomowoc, WI (US)

(73) Assignee: Matthews International Corporation, Pittsburgh, PA (US)

( * ) Notice: Subject to any disclaimer, the term of this patent is extended or adjusted under 35 U.S.C. 154(b) by 0 days.

(21) Appl. No.: 15/267,947

(22) Filed: Sep. 16, 2016

(65) Prior Publication Data

US 2017/0066598 A1 Mar. 9, 2017

Related U.S. Application Data

(63) Continuation of application No. 14/451,175, filed on Aug. 4, 2014, now Pat. No. 9,446,908, and a
(Continued)

(51) Int. Cl.
| | |
|---|---|
| *G06F 7/00* | (2006.01) |
| *B65G 43/08* | (2006.01) |
| *B07C 5/34* | (2006.01) |
| *B07C 5/04* | (2006.01) |
| *B07C 5/32* | (2006.01) |

(Continued)

(52) U.S. Cl.
CPC ............... *B65G 43/08* (2013.01); *B07C 5/04* (2013.01); *B07C 5/32* (2013.01); *B07C 5/3412* (2013.01); *G05B 19/124* (2013.01); *G06K 7/0004* (2013.01); *B07C 2301/0016* (2013.01);
(Continued)

(58) Field of Classification Search
USPC .......................................................... 700/225
See application file for complete search history.

(56) References Cited

U.S. PATENT DOCUMENTS

| | | | |
|---|---|---|---|
| 4,002,886 A | 1/1977 | Sundelin | |
| 4,331,328 A | 5/1982 | Fasig | |

(Continued)

FOREIGN PATENT DOCUMENTS

| | | |
|---|---|---|
| CN | 1395199 | 2/2003 |
| CN | 1396543 | 2/2003 |

(Continued)

OTHER PUBLICATIONS

Cheney "No Gags in Spencer's Distribution" Jun. 1994, *American Shipper* 36(6):56-69.

(Continued)

*Primary Examiner* — Kyle O Logan
(74) *Attorney, Agent, or Firm* — Pepper Hamilton LLP

(57) ABSTRACT

Systems and methods of associating data to an item being transported by a conveying system are disclosed. The item and data associated with the item are received at a first zone of the conveying system. The data is stored in a first computer-readable storage medium associated with the first zone. The item is transported to a second zone of the conveying system, and the data stored in the first computer-readable storage medium is transferred to a second computer-readable storage medium associated with the second zone.

21 Claims, 4 Drawing Sheets

Related U.S. Application Data continuation of application No. PCT/US2013/024349, filed on Feb. 1, 2013.

(60) Provisional application No. 61/863,409, filed on Aug. 7, 2013, provisional application No. 61/595,098, filed on Feb. 5, 2012.

(51) Int. Cl.
*G05B 19/12* (2006.01)
*G06K 7/00* (2006.01)
*G06K 17/00* (2006.01)

(52) U.S. Cl.
CPC ........... *B65G 2203/0216* (2013.01); *G05B 2219/40538* (2013.01); *G06K 2017/0045* (2013.01)

(56) References Cited

U.S. PATENT DOCUMENTS

| | | | |
|---|---|---|---|
| 4,424,082 A | 1/1984 | Rowan | |
| 4,491,982 A | 1/1985 | Candy et al. | |
| 4,500,880 A | 2/1985 | Gomersall et al. | |
| 4,598,275 A | 7/1986 | Ross et al. | |
| 4,792,273 A | 12/1988 | Specht | |
| 4,854,439 A | 8/1989 | Ueda | |
| 4,936,738 A | 6/1990 | Brennan et al. | |
| 4,962,466 A | 10/1990 | Revesz et al. | |
| 5,151,684 A | 9/1992 | Johnsen | |
| 5,228,558 A | 7/1993 | Hall | |
| 5,260,694 A | 11/1993 | Remahl | |
| 5,271,703 A | 12/1993 | Lindqvist et al. | |
| 5,294,004 A | 3/1994 | Leverett | |
| 5,315,094 A * | 5/1994 | Lisy .................. G01G 19/414 198/339.1 | |
| 5,348,485 A | 9/1994 | Briechle et al. | |
| 5,505,473 A | 4/1996 | Radcliffe | |
| 5,676,514 A | 10/1997 | Higman et al. | |
| 5,730,274 A | 3/1998 | Loomer | |
| 5,781,443 A | 7/1998 | Street et al. | |
| 5,812,986 A | 9/1998 | Danelski | |
| 5,842,555 A | 12/1998 | Gannon et al. | |
| 5,862,907 A | 1/1999 | Taylor | |
| 5,886,634 A | 3/1999 | Muhme | |
| 5,990,437 A | 11/1999 | Coutant et al. | |
| 6,021,888 A | 2/2000 | Itoh et al. | |
| 6,047,812 A | 4/2000 | Horn et al. | |
| 6,205,396 B1 | 3/2001 | Teicher et al. | |
| 6,246,023 B1 | 6/2001 | Kugle | |
| 6,289,260 B1 | 9/2001 | Bradley et al. | |
| 6,315,104 B1 | 11/2001 | Ebert | |
| 6,331,437 B1 | 12/2001 | Cohen et al. | |
| 6,377,867 B1 | 4/2002 | Bradley et al. | |
| 6,481,261 B1 | 11/2002 | Ellis | |
| 6,505,093 B1 | 1/2003 | Thatcher et al. | |
| 6,543,693 B1 | 4/2003 | Stern et al. | |
| 6,544,068 B1 | 4/2003 | Hatton | |
| 6,597,969 B2 | 7/2003 | Greenwald et al. | |
| 6,650,225 B2 | 11/2003 | Bastian, II et al. | |
| 6,711,461 B2 | 3/2004 | Flores | |
| 6,729,463 B2 | 5/2004 | Pfeiffer | |
| 6,731,094 B1 | 5/2004 | Itoh et al. | |
| 6,762,382 B1 | 7/2004 | Danelski | |
| 6,762,681 B1 | 7/2004 | Danelski | |
| 6,775,588 B1 | 8/2004 | Peck | |
| 6,820,736 B2 | 11/2004 | Itoh et al. | |
| 6,827,202 B2 | 12/2004 | Topmiller et al. | |
| 6,873,881 B1 | 3/2005 | Schneible, Sr. | |
| 6,879,306 B2 | 4/2005 | Spoonhower et al. | |
| 6,971,833 B1 | 12/2005 | Freudelsperger et al. | |
| 7,084,738 B2 | 8/2006 | Bastian, II | |
| 7,263,409 B2 | 8/2007 | LeVasseur et al. | |
| 7,542,823 B2 | 6/2009 | Nagai | |
| 7,591,365 B2 | 9/2009 | Knepple et al. | |
| 7,591,366 B2 | 9/2009 | Taylor | |
| 7,631,869 B2 | 12/2009 | Bowers et al. | |
| 7,705,742 B1 | 4/2010 | Delaney, III et al. | |
| 7,756,603 B1 | 7/2010 | Delaney, III et al. | |
| 7,905,345 B2 | 3/2011 | Taylor | |
| 7,909,155 B2 | 3/2011 | Lupton et al. | |
| 8,073,562 B2 | 12/2011 | Danelski | |
| 2002/0174038 A1 | 11/2002 | Chien | |
| 2004/0010337 A1 | 1/2004 | Mountz | |
| 2005/0035694 A1 | 2/2005 | Stevens | |
| 2005/0043850 A1 | 2/2005 | Stevens et al. | |
| 2005/0047895 A1 | 3/2005 | Lert, Jr. | |
| 2005/0071234 A1 | 3/2005 | Schon | |
| 2005/0140498 A1 | 6/2005 | Bastian, II | |
| 2005/0149226 A1 | 7/2005 | Stevens et al. | |
| 2006/0238307 A1 | 10/2006 | Bauer et al. | |
| 2007/0210923 A1 | 9/2007 | Butler et al. | |
| 2008/0183326 A1 | 7/2008 | Danelski | |
| 2008/0183328 A1 | 7/2008 | Danelski | |
| 2008/0234853 A1 | 9/2008 | Antonuk et al. | |
| 2008/0270327 A1 | 10/2008 | Freudelsperger | |
| 2009/0074545 A1 | 3/2009 | Lert, Jr. et al. | |
| 2009/0173780 A1 | 7/2009 | Ramamoorthy et al. | |
| 2009/0301839 A1 | 12/2009 | Taylor | |
| 2010/0015925 A1 | 1/2010 | Gruber | |
| 2010/0223781 A1 * | 9/2010 | Sumi .................. H05K 13/0452 29/739 | |
| 2010/0322473 A1 * | 12/2010 | Taylor .................. B65G 43/10 382/103 | |
| 2012/0022684 A1 | 1/2012 | Hernot | |
| 2012/0024669 A1 | 2/2012 | Danelski et al. | |
| 2012/0150342 A1 * | 6/2012 | Song .................. B07C 3/02 700/226 | |
| 2014/0343720 A1 | 11/2014 | Danelski | |
| 2014/0351101 A1 | 11/2014 | Danelski | |

FOREIGN PATENT DOCUMENTS

| | | |
|---|---|---|
| CN | 1817757 | 8/2006 |
| CN | 101968860 | 2/2011 |
| DE | 4000603 | 7/1991 |
| DE | 19947259 | 9/2000 |
| DE | 102006051777 | 5/2008 |
| EP | 2810220 | 12/2014 |
| EP | 2810225 | 12/2014 |
| FR | 2881663 | 8/2006 |
| JP | H02(1990)-285403 A | 11/1990 |
| JP | H03(1991)-221359 | 9/1991 |
| JP | 2003-065833 A | 3/2003 |
| JP | 2005-216957 A | 8/2005 |
| JP | 2009-263018 A | 11/2009 |
| JP | 2016-533579 A | 10/2016 |
| KR | 10-2004-0036899 A | 5/2004 |
| KR | 10-2006-0020301 A | 3/2006 |
| WO | WO 2003/007256 A2 | 1/2003 |
| WO | WO 2012/024278 A1 | 2/2012 |
| WO | WO 2013/116620 A1 | 8/2013 |
| WO | WO 2013/116652 A1 | 8/2013 |
| WO | WO 2015/020976 A2 | 2/2015 |

OTHER PUBLICATIONS

Hitchcock "Paperless Picking Increases Productivity by Over 300%" Jul. 1993, *Modern Materials Handling* 48(8):20(30).

International Search Report and Written Opinion for PCT/US14/49638 dated Mar. 12, 2015.

International Search Report for PCT/US2013/024308 dated May 15, 2013.

International Search Report for PCT/US2013/024349 dated May 15, 2013.

Supplemental European Search Report for EP 13743539 dated Aug. 12, 2015.

Supplemental European Search Report for EP 13744016 dated Aug. 5, 2015.

Supplemental European Search Report and Written Opinion for EP 14758722 dated Dec. 22, 2016.

(56) References Cited

OTHER PUBLICATIONS

Wei et al. "Solving the Fixed Shelf Order-Picking Optimization Problem Using the Modified LK Algorithm" Jun. 2004 *Computer Applications* 24(6):1.
Supplemental European Search Report and Written Opinion for EP 14759363 dated Aug. 17, 2017.

\* cited by examiner

CONVEYING SYSTEMS AND METHODS OF ASSOCIATING DATA WITH AN ITEM TRANSPORTED BY A CONVEYING SYSTEM

CROSS REFERENCE TO RELATED APPLICATIONS

This application is a continuation of U.S. patent application Ser. No. 14/451,175 filed on Aug. 4, 2014, which claims the benefit of U.S. Provisional Application No. 61/863,409 filed on Aug. 7, 2013. U.S. patent application Ser. No. 14/451,175 is also a continuation application of International Application No. PCT/US2013/0243349 filed on Feb. 1, 2013, which claims the benefit of U.S. Provisional Application No. 61/595,098 filed Feb. 5, 2012. The contents of each of these applications are incorporated by reference in their entirety as if fully set forth herein.

BACKGROUND

The present disclosure relates to conveying systems and methods, and in particular to conveying systems and methods of associating data with items being transported by a conveying system.

Conveying systems are used for a variety of purposes. Exemplary conveying systems include packaging systems, order fulfillment systems, manufacturing systems, shipping sortation systems, and returns processing systems. Some conveying systems use centralized multi-horsepower AC motors to drive shafts, belts or chains that, in turn, move banks of rollers to transport items throughout the conveying system. Other conveying systems include rollers with internal DC "micro-horsepower" motors that drive a localized segment of rollers. The latter systems include brushless DC roller conveying systems. A brushless DC roller conveying system includes several components and features, such as drive rollers with self-contained brushless DC motors, intelligent local controllers, and networking between the controllers based on bidirectional communication protocols.

Brushless DC roller conveying systems can be controlled by local controllers that control local functions in each of a plurality of zones of the conveying system and a centralized controller that tracks "items" (such as corrugated boxes, plastic totes, or pallets) as the items are transported through the conveying system. The centralized controllers tracks items by uniquely identifying the items at decision points in the conveyor system. These decision points include, for example, diverts, transfers, merges, order picking zones, weighing, sortation, and printing.

To uniquely identify the items, the conveyor systems often use bar codes that are printed on adhesive labels that are adhered to the items. Alternatively, a permanent bar code label on a reusable tote could be temporarily assigned to item(s) contained within the tote. The bar code associated with the permanent label is re-assigned when the items within the tote are changed.

As items are transported throughout the conveyor system, bar code scanners are positioned at decision points to read the bar codes. At each decision point, the bar code information is electronically sent to the centralized controller. The centralized controller determines operations to be performed for the item or data to be transmitted to the barcode scan location. This methodology is sub-optimal for a variety of reasons. For example, equipment capable of reading bar codes on moving items is expensive and can represent a large percentage of the cost of a conventional automated conveyor system. In addition, bar code scanners throughout the conveying system are in communication with the central control system, which may result in extensive and expensive data communication networks and associated cabling. Moreover, information required at decision points is stored in a central database. Timely access to that database can become challenging on large automated conveyor systems because the central controller must service all decision points simultaneously.

The bar codes used in conventional automated conveyor systems are one-dimensional bar codes that uniquely identify the item. However, one-dimensional bar codes do not contain any additional data about the item. Instead, data that determines the functions to be performed by the conveying system is stored remotely in a database associated with the centralized controller. This data can include routing information, order data, sort points, return points, or the like.

In a conventional conveying system, an item having an affixed one-dimensional bar code is transported by the conveying system. The conveying system includes a first zone and a second zone, where each zone includes a conveyor section that transports items, a bar code reader configured to scan bar codes affixed to the items, and a local controller. The conveying system further includes a centralized controller and a centralized database. The bar code reader scans the bar code for an item when the item enters the corresponding zone and transmits the bar code information to the local controller. The local controller retransmits the bar code information to the centralized controller for processing based on the operation for the particular zone. For example, if the first zone includes a scale, the centralized controller could send an expected weight for the item identified by the bar code information to the local controller for the first zone for comparison with the actual weight of the item. If the second zone includes a label printer, the centralized controller will send information to the local controller for the second zone to cause the label printer to print an appropriate label for the item.

One problem with such systems is that the one-dimensional bar code does not allow information to be passed from one zone to another. Moreover, the information in the one-dimensional bar code cannot be updated. In addition, as stated before, the centralized controller can become a bottleneck for information transfer throughout the conveying system. Finally, bar code readers are required at every zone in such conveying systems, which is a significant cost for the conveying system and can slow down operation of the system to allow items to be scanned.

A similar conveying system including items with RFID tags have been implemented. Such conveying systems allow information to be transferred from one zone to another (by writing information to the RFID tag). However, including RFID tags with every item can increase expenses significantly for large systems. Even in conveying systems in which RFID tags can be reused, RFID tags can only be written a predefined number of times before they fail to operate reliably. Moreover, such systems require RFID tag readers at every zone, which is a significant expense and can slow down operation of the system to allow tags to be scanned.

The use of two-dimensional bar codes has allowed additional data to be passed along with the item. For example, two-dimensional bar codes can include data about a predefined route of a specific item within the automated conveyor system. However, two-dimensional bar codes cannot be updated, thereby limiting the ability to update the data stored therein.

SUMMARY

In an embodiment, a method of associating data with an item being transported by a conveying system may include receiving an item at a first zone of a conveying system, receiving data associated with the item, storing the data in a first non-transitory computer-readable storage medium associated with the first zone, transporting the item to a second zone of the conveying system, and transferring the data stored in the first computer-readable storage medium to a second non-transitory computer-readable storage medium associated with the second zone.

In an embodiment, a method of associating data with an item being transported by a conveying system may include receiving an item from a first zone of a conveying system at a second zone of the conveying system, receiving, by a local controller of the second zone, data associated with the item from a local controller of the first zone of the conveying system, wherein the data comprises an expected value for a property of the item, comparing, by the local controller of the second zone, the expected value for the property with an actual value for the property, in response to the comparing satisfying a threshold condition: transporting the item to a third zone of the conveying system, and transferring the data to a local controller of the third zone by the local controller of the second zone, and, in response to the comparing not satisfying the threshold condition, transporting the item to a fourth zone of the conveying system.

DETAILED DESCRIPTION

This disclosure is not limited to the particular systems, devices, and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Figure 1:
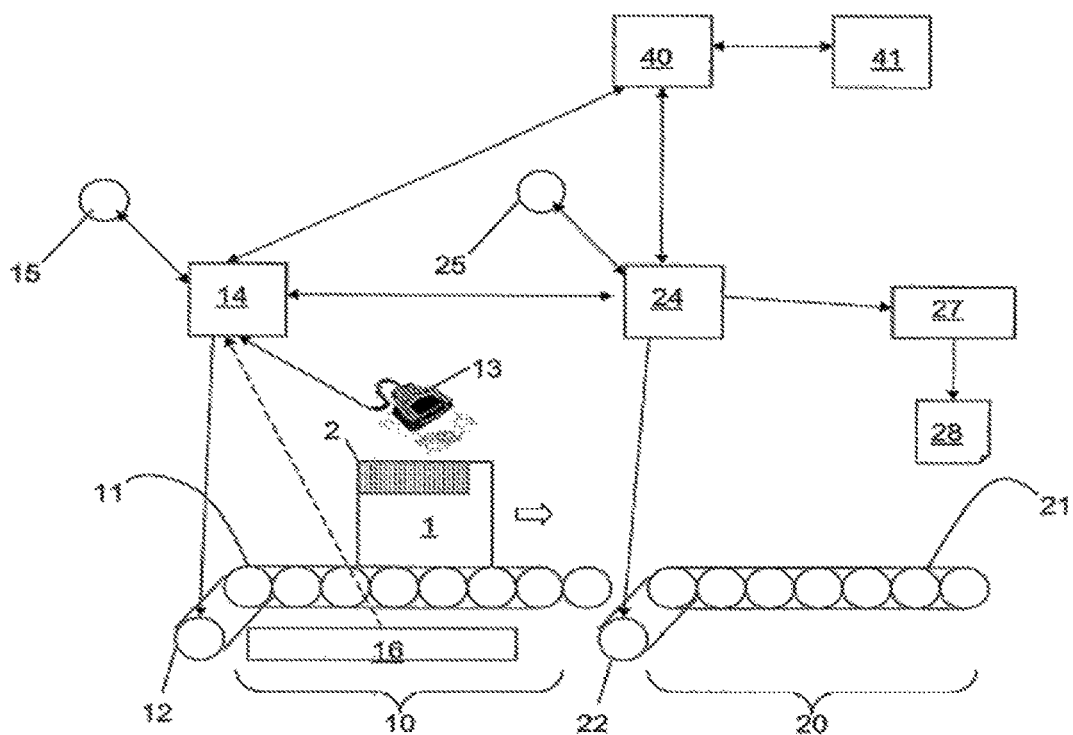
FIG. 1 depicts a block diagram of an illustrative conveying system according to an embodiment.

FIG. 1 depicts a block diagram of an illustrative conveying system according to an embodiment. As shown in FIG. 1, the conveying system includes a first zone 10 and a second zone 20. Each zone 10, 20 may include a conveyor section 11, 21 configured to transports items, such as 1, a driver 12, 22 configured to drive the conveyor section 11, 21, a local controller 14, 24, and a non-transitory computer-readable storage medium 15, 25. In an embodiment, at least one zone, such as the first zone 10, may further include a data tag reader 13 (such as a bar code reader) configured to read data encoded in a data tag 2 (such as a bar code) associated with the item 1. In the embodiment depicted in FIG. 1, the first zone 10 further includes a scale 16, and the second zone 20 further includes a label printer 27. However, it will be apparent to those of ordinary skill in the art that additional physical operations and devices may be used in each of the first and second zones 10, 20. In an embodiment, the conveying system further includes a centralized controller 40 and a centralized database 41. In an alternate embodiment, the conveying system does not include a centralized controller or a centralized database. In such an embodiment, data may be stored in the computer-readable storage media 15, 25 associated with the respective zones.

As shown in FIG. 1, the first zone 10 includes a scale 16, and the second zone 20 includes a label printer 27. These functions of the first zone 10 and second zone 20 were selected to illustrate one potential implementation for a conveying system. Other embodiments are also considered within the scope of this disclosure. For example, any number of operations could benefit from allowing data to move through the conveying system with the item, such as at decision points in the conveying system, which may include diverts, transfers, merges, order picking zones, weighing, sortation, printing, and the like.

Figure 2:
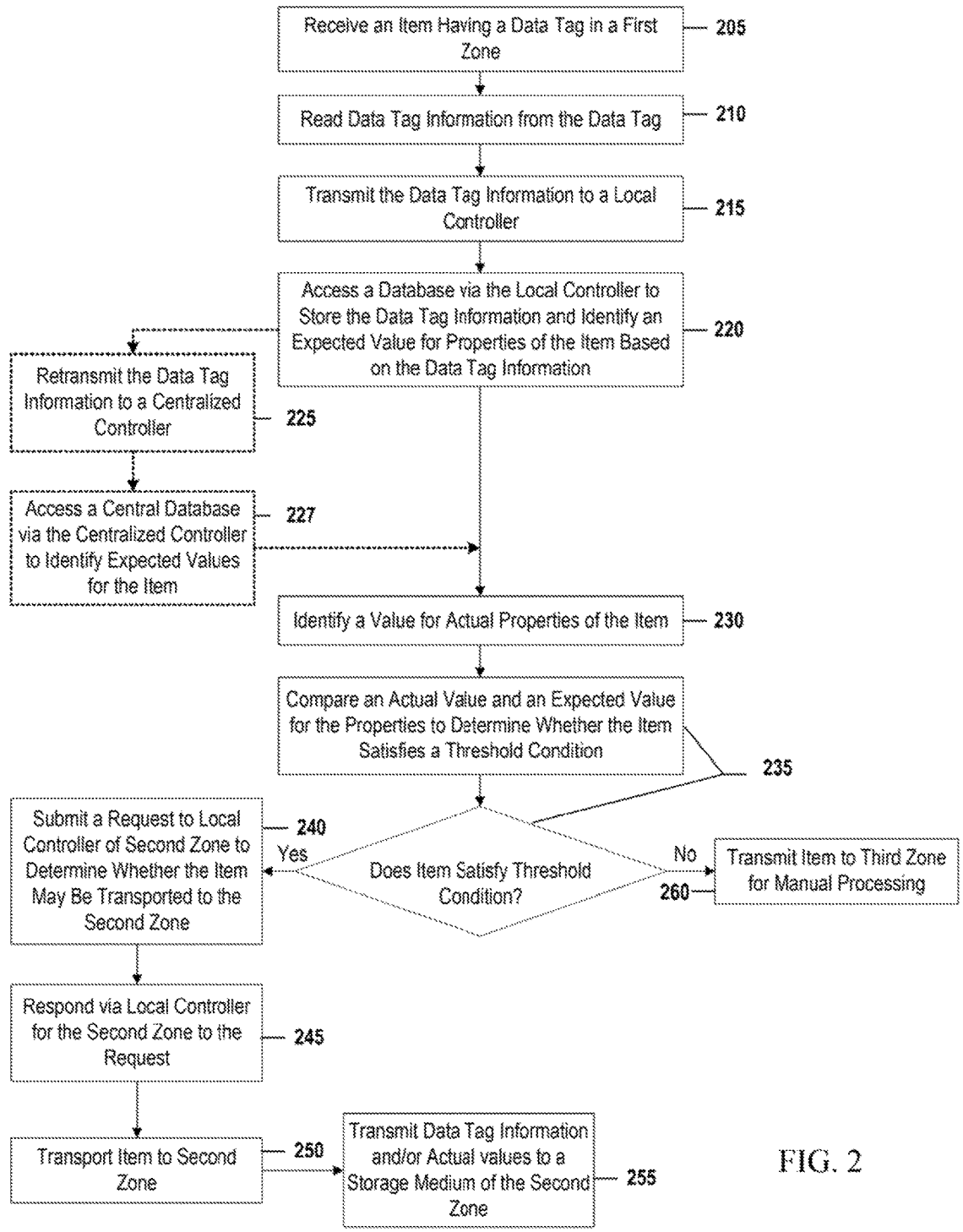
FIG. 2 depicts an illustrative method of associating data with an item being transported by the conveying system according to an embodiment.

FIG. 2 depicts an illustrative method of associating data with an item being transported by the conveying system according to an embodiment. As shown in FIG. 2, an item having a data tag, such as, for example, a one-dimensional bar code, a two-dimensional bar code, an RFID tag, or the like, may be received 205 in a first zone. A data tag reader may read 210 (or scan) the data tag. The data tag reader may transmit 215 the data tag information to a local controller. In an embodiment, the local controller may access 220 a database to store the data tag information and identify an expected value for each of one or more properties for the item based on the data tag information. In an alternate embodiment, the local controller may retransmit 225 the data tag information to a centralized controller, which accesses 227 a central database to identify the expected values for the item.

A value for each of one or more actual properties of the item may be identified 230. For example, a scale may be used to identify 230 a weight of the item. In an alternate embodiment, physical dimensions of the item may be identified 230 using one or more sensors. Additional and/or alternate properties may be identified 230 within the scope of this disclosure. The local controller may compare 235 an actual value and an expected value for each property to determine whether the item satisfies a threshold condition.

If the item satisfies the threshold condition, the local controller for the first zone may submit 240 a request to a local controller for a second zone to determine whether the item may be transported to the second zone. The local controller for the second zone may respond 245 to the request when the item can be transported. The item may then be transported 250 to a second zone, and the data tag information and/or the one or more actual values for the properties may be transmitted 255 to a non-transitory computer-readable storage medium associated with the second zone.

If the item does not satisfy the threshold, the item may be transported 260 to a third zone for manual processing.

In an embodiment, the second zone (and subsequent zones, if any) need not rescan the data tag on the item because the information is stored locally and transferred to the corresponding zone as, before or after the item is being transported. As such, information relevant to the zone for an item having a particular data tag may be stored at the zone in a local non-transitory computer-readable storage medium. As such, the data tag may only be scanned in the first zone, thereby speeding up the transportation of the item through the conveying system. In particular, the disclosed method avoids the need for a data tag reader at each decision point in the conveying process, and eliminates the time needed for reading physical data tags, such as bar codes or RFID tags, in all but one zone. Moreover, in an embodiment, all processing may be performed locally, which resolves the potential for blocking at a centralized controller.

It will be understood that the above described method is one exemplary embodiment and that alternate methods may include variations from the above description as well as additional features, some of which are described below.

As described in reference to FIG. 2, the data tag is affixed to the item. However, the data tag could be affixed to a container holding the item or be integrated with the container holding the item, or otherwise associated with the item.

The conveying system may use rollers with internal DC "micro-horsepower" motors that drive a localized segment of rollers, including brushless DC roller conveying systems. The brushless DC roller conveying system may include drive rollers with self-contained brushless DC motors, intelligent local controllers and networking between the local controllers based on bidirectional communication protocols. These types of conveyor systems may segment long runs of conveyor into zones that hold a single item in a "Zone". Each zone may have its own powered/motorized roller and can be started and stopped independently of the other zones on the system.

The local controller, in addition to driving the brushless motor, may also have the capability of communicating with external control components through digital I/O (Inputs and Outputs). These devices include but are not limited to photo eye sensors, limit switches, operator interfaces, solenoid valves, motor contactors, sensors, and the like. Each controller may include a microprocessor and may be in communication with a non-transitory computer-readable storage medium. The computer-readable storage medium may be of a sufficient size to store information pertaining to the item within the particular zone. The computer-readable storage medium may not exist as a physical device that travels with the item (as in conventional systems), but instead may act a virtual data tag that travels with the item. Because the data tag is virtual, no cost is associated with the data tag or the reader/writer devices that are conventionally required throughout conveying systems to read and write RFID tags. Also, since the data is transferred electronically, there are no speed issues relative to the transfer of the data.

The conveying system may include a motor driven roller conveyor line, which is basically a series of individual conveyors (zones) connected end to end to create longer lengths of conveyor. Each section of conveyor may contain its own drive roller which is coupled to the other rollers in that zone. Typically, as an item is conveyed on a conveyor line, each local controller communicates with the controller(s) adjacent to it to move an item from one zone to another. A storage medium may reside on a zone controller card of each local controller.

The following description describes, in more detail, an example in which a bar code is associated with an item to be transported in a conveying system that includes local computer-readable storage media. According to the example, the conveying system conveys an item in a container, weighs the item to determine whether the item is the correct weight (based on the bar code), and either diverts the box to a reject lane or prints a shipping label specific to that item.

Figure 3:
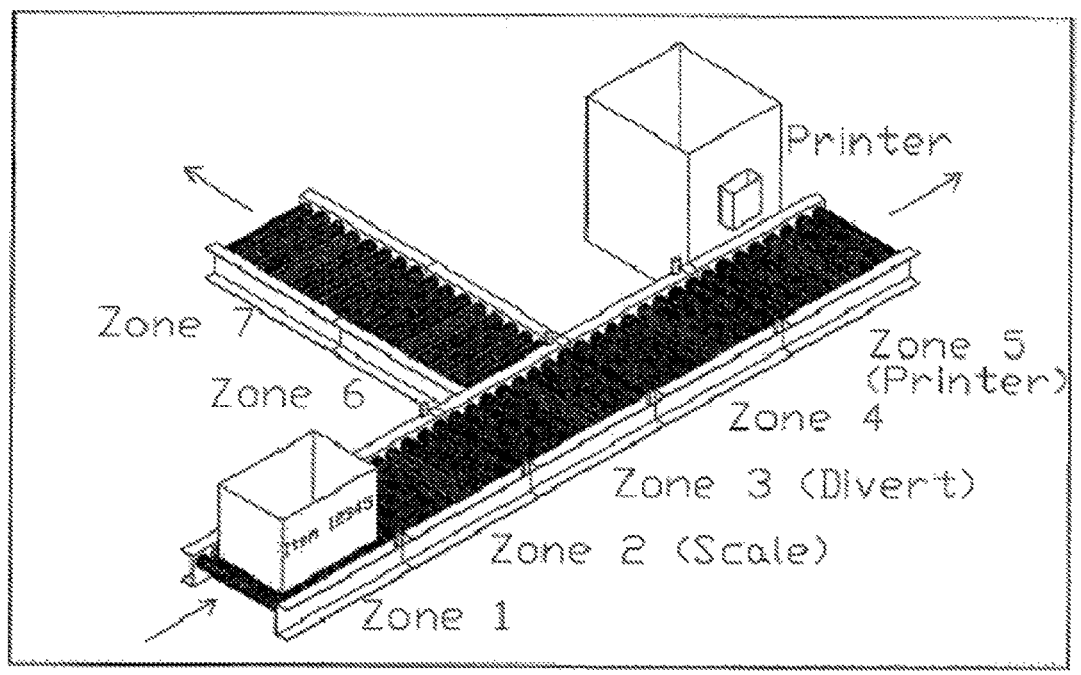
FIG. 3 depicts an illustrative conveyor system according to an embodiment.

According to the example, illustrated in FIG. 3, a box (the item) enters Zone 1. A bar code scanner reads a bar code on the item and identifies the item as Item 12345. The identifying information for Item 12345 is sent to a local database to access specific information about the item. The item information may include a customer address, an expected weight, expected dimensions, a desired shipping method (such as, United States Postal Service delivery, UPS® delivery, Fed-Ex® delivery, or the like), a quantity, a SKU, whether the item is fragile, whether the item requires additional packaging, and/or the like.

Once the scanner captures the information, Zone 1 queries Zone 2 to determine whether Zone 2 can accept the item (currently occupying Zone 1). If Zone 2 is clear, Zone 2 will activate its conveyor and notify Zone 1 that it is clear. Zone 1 then turns on its conveyor and transports the item towards Zone 2. As the item is being transported from Zone 1 to Zone 2, Zone 1 may send the entire data record for the item to Zone 2.

Once the item is located in Zone 2 and the data record associated with the item has been electronically transferred to the computer-readable storage medium for Zone 2, a scale in Zone 2 weighs the item. The actual weight is stored in the data record. Zone 2 queries Zone 3 to determine whether Zone 3 can accept the item. If Zone 3 is clear, Zone 3 will activate its conveyor and notify Zone 2 that it is clear. Zone 2 then turns on its conveyor and transports the item towards Zone 3. As the item is being transported from Zone 2 to Zone 3, Zone 2 may send the entire data record (including the recorded weight) for the item to Zone 3.

Once the item is located in Zone 3, the local controller for Zone 3 may compare the expected weight with the actual weight (as measured in Zone 2). If the local controller in Zone 3 determines that the actual weight is not the same as the expected weight, within a prescribed tolerance, Zone 3 will divert the item to Zone 6 (a reject conveyor). In this instance, Zone 3 queries Zone 6 to determine whether Zone 6 can accept the item. If Zone 6 is clear, Zone 6 will activate its conveyor and notify Zone 3 that it is clear. Zone 3 then turns on its conveyor and transports the item towards Zone 6.

In contrast, if the local controller in Zone 3 determines that the actual weight substantially matches the expected weight, Zone 3 will transport the item to Zone 4. In this instance, Zone 3 queries Zone 4 to determine whether Zone 4 can accept the item. If Zone 4 is clear, Zone 4 will activate its conveyor and notify Zone 3 that it is clear. Zone 3 then turns on its conveyor and transports the item towards Zone 4. As the item is being transported from Zone 3 to Zone 4, Zone 3 may send the entire data record for the item to Zone 4. Zone 4 may further transport the item to Zone 5 in a similar manner.

When the item arrives at Zone 5, a label printer may print a shipping label for the item. The data for the shipping label may be included in the data record now resident in the local non-transitory computer-readable storage medium in Zone 5. As such, the controller may retrieve the required information and cause the printer to print the label. The order may then be marked as shipped. The completed order information may be sent to an order tracking database separate from the conveying system.

Figure 4:
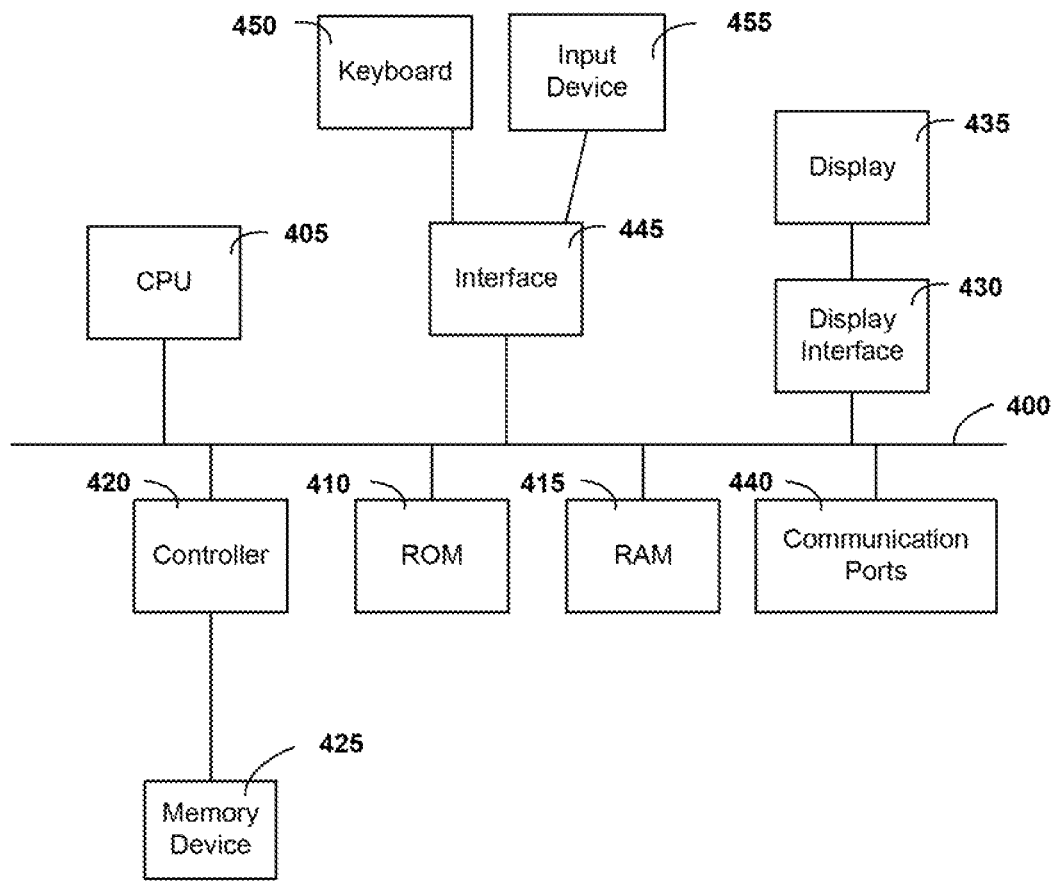
FIG. 4 depicts a block diagram of illustrative internal hardware that may be used to contain or implement program instructions according to an embodiment.

FIG. 4 depicts a block diagram of illustrative internal hardware that may be used to contain or implement program instructions according to an embodiment. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an exemplary processing device, computing device or processor as such terms are used within this disclosure. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the steps, applications, or the like described above may be stored in the ROM 410 and/or the RAM 415. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 430 may permit information from the bus 400 to be displayed on the display 435 in audio, visual, graphic or alphanumeric format. The information may include information related to a current job ticket and associated tasks. Communication with external devices may occur using various communication ports 440. An exemplary communication port 440 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim 1ncludes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, " a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, " a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of associating data with an item being transported by a conveying system, the method comprising:
   receiving an item at a first zone of a conveying system;
   receiving data associated with the item;
   storing the data in a first non-transitory computer-readable storage medium associated with the first zone;
   transporting the item to a second zone of the conveying system, wherein transporting the item to a second zone comprises:
   (a) querying the second zone via the first zone to determine whether the second zone can accept the item, wherein the second zone determines whether the second zone can accept the item without using the data tag reader,
   (b) activating a second conveyer of the second zone responsive to the second zone indicating that the second zone can accept the item, and
   (c) activating a first conveyer of the first zone to move the item to the second conveyer; and
   transferring the data stored in the first computer-readable storage medium to a second non-transitory computer-readable storage medium associated with the second zone.

2. The method of claim 1, wherein receiving data associated with the item comprises:
   reading data from a data tag associated with the item using a data tag reader associated with the first zone.

3. The method of claim 2, wherein the data read by the data reader is stored into the first computer-readable storage medium.

4. The method of claim 2, wherein the data reader includes at least one of a bar code reader and a RFID reader.

5. The method of claim 1, wherein receiving data associated with the item comprises:
   receiving data from a database remote from the first zone.

6. The method of claim 1, further comprising:
   sensing a property of the item using a sensor associated with the first zone.

7. The method of claim 6, wherein receiving data associated with the item comprises:
   receiving data pertaining to the property of the item.

8. The method of claim 6, wherein sensing a property of the item comprises sensing a weight of the item.

9. The method of claim 6, wherein sensing a property of the item comprises sensing one or more dimensions of the item.

10. A method of associating data with an item being transported by a conveying system, the method comprising:
    receiving an item from a first zone of a conveying system at a first adjacent zone of the conveying system;
    receiving, by a local controller of the first adjacent zone, data associated with the item from a local controller of the first zone of the conveying system, wherein the data comprises an expected value for a property of the item;
    comparing, by the local controller of the first adjacent zone, the expected value for the property with an actual value for the property; and
    in response to the comparing satisfying a threshold condition:
        transporting the item to a second adjacent zone of the conveying system upon receiving notification that the second adjacent zone can accept the item, and
        transferring the data to a local controller of the second adjacent zone by the local controller of the first adjacent zone.

11. The method of claim 10, wherein the property comprises a weight of the item.

12. The method of claim 10, wherein the property comprises one or more dimensions of the item.

13. The method of claim 10, wherein the data further comprises the actual value for the property.

14. The method of claim 10, further comprising:
    sensing, by a sensor, the actual value for the property; and
    transmitting, by the sensor, the actual value for the property to the local controller for the second zone.

15. A conveying system comprising:
    a plurality of zones, each comprising:
        a conveyor section configured to transport an item;
        a driver configured to drive the conveyor section;
        a non-transitory computer-readable storage medium configured to store data associated with the item; and
        a controller configured to communicate with a controller of at least one adjacent zone, control the driver to transport the item into the adjacent zone, and control the computer-readable storage medium to transfer the stored data into the computer-readable storage medium of the at least one adjacent zone,
    wherein the controller of the first zone is configured to control the driver of the first zone to transport the item into the at least one adjacent zone if the controller of the first zone receives notification that the at least one adjacent zone can accept the item and is configured to control the driver of the first zone to transport the item into an alternate adjacent zone if the controller of the first zone receives notification that the at least one adjacent zone cannot accept the item.

16. The conveying system of claim 15, wherein one of the plurality of zones includes a data reader configured to read data from a data tag associated with the item.

17. The conveying system of claim 16, wherein the data reader includes at least one of a bar code reader and a RFID reader.

18. The conveying system of claim 15, wherein one of the plurality of zones includes a sensor configured to sense a property of the item.

19. The conveying system of claim 18, wherein the sensor is a scale configured to sense a weight of the item.

20. The conveying system of claim 15, wherein one of the plurality of zones includes a processor configured to process an item based on the data stored in the non-transitory computer-readable storage medium.

21. The conveying system of claim 20, where the processor is a label printer configured to print a label for the item based on a property of the item.

* * * * *